(12) United States Patent
Galgoci et al.

(10) Patent No.: US 7,901,215 B1
(45) Date of Patent: Mar. 8, 2011

(54) ELECTRICAL HARNESS ASSEMBLIES

(75) Inventors: Brad D. Galgoci, Fenton, MI (US);
Matthew D. Bush, Rochester Hills, MI (US); David M. Olney, Ortonville, MI (US); Jeff W. Harris, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/582,406

(22) Filed: Oct. 20, 2009

(51) Int. Cl.
*H01R 33/00* (2006.01)

(52) U.S. Cl. ........... 439/34; 439/502; 439/218; 439/528; 307/10.1

(58) Field of Classification Search ............. 439/34–36, 439/502–504, 218, 528; 307/10.1
See application file for complete search history.

(56) References Cited

U.S. PATENT DOCUMENTS

| | | | | |
|---|---|---|---|---|
| 5,380,209 | A * | 1/1995 | Converse et al. | 439/35 |
| 5,997,320 | A * | 12/1999 | DeMello | 439/148 |
| 6,273,729 | B1 * | 8/2001 | Kelly | 439/36 |
| 7,137,724 | B2 * | 11/2006 | Menze et al. | 362/543 |
| 7,438,458 | B2 * | 10/2008 | Menze et al. | 362/543 |
| 2002/0019165 | A1 * | 2/2002 | Aoki et al. | 439/502 |
| 2003/0109171 | A1 * | 6/2003 | Morgan | 439/502 |
| 2006/0172559 | A1 * | 8/2006 | Menze et al. | 439/36 |

* cited by examiner

*Primary Examiner* — Gary F. Paumen
(74) *Attorney, Agent, or Firm* — Ingrassia Fisher & Lorenz, P.C.

(57) ABSTRACT

An electrical harness assembly is provided for coupling a first electrical component in a vehicle to a second electrical component in a removable vehicle portion. The assembly includes a first harness having a first connector and a second connector and configured to be coupled to the first electrical component. The assembly further includes a second harness having a third connector and a fourth connector and configured to be coupled to the second electrical component. In a first state, the first connector mates with the third connector and the second connector mates with the fourth connector, and in a second state, the first connector mates with the second connector.

13 Claims, 2 Drawing Sheets

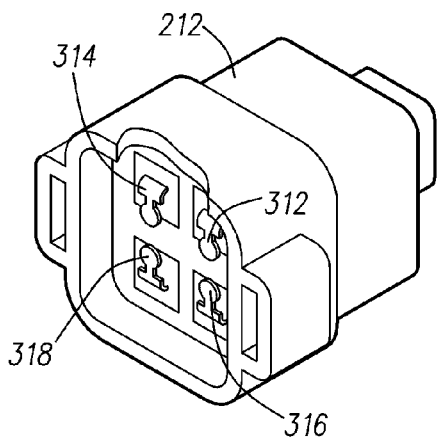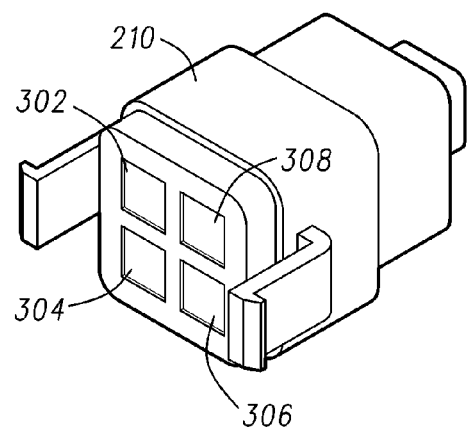
Fig. 4  Fig. 3
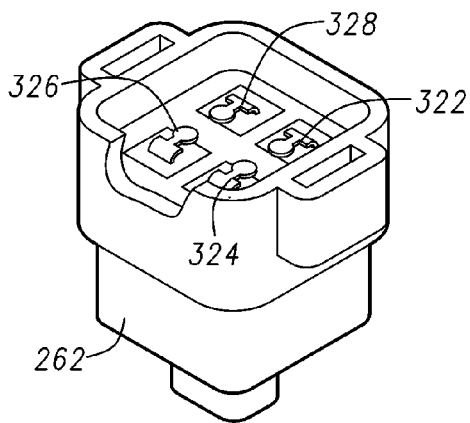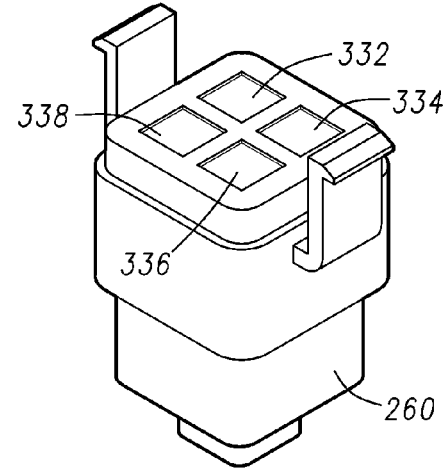
Fig. 5  Fig. 6
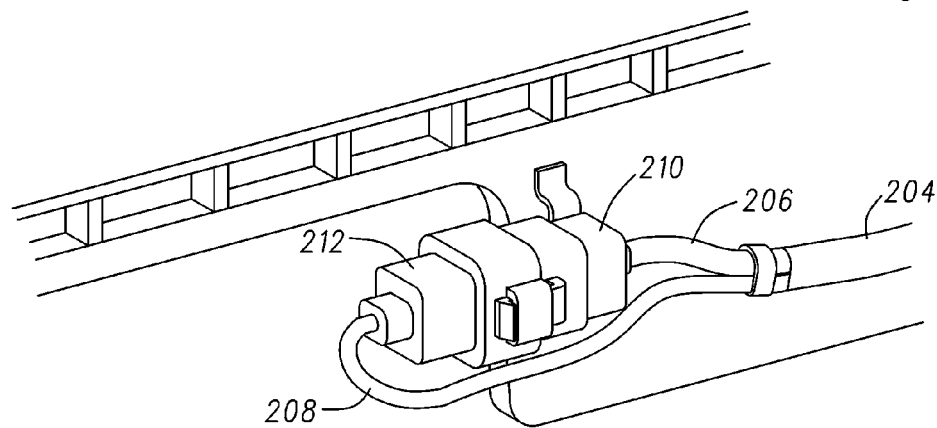
Fig. 7

ELECTRICAL HARNESS ASSEMBLIES

TECHNICAL FIELD

The present invention generally relates to electrical harness assemblies, and more particularly relates to vehicle harness assemblies associated with an electrical component located in the tailgate of the vehicle.

BACKGROUND OF THE INVENTION

Pickup trucks are widely used in both urban and rural areas with increasing popularity. A pickup truck is characterized by a cargo bed accessible via a tailgate. In particular, the tailgate is pivotally mounted at the rear of the cargo bed. When the tailgate is in the up position, it serves as a rear wall for the cargo bed. When in the down position, the tailgate lies flat to enable loading and unloading of the cargo bed.

Many vehicles, including pickup trucks, are now outfitted with rear vision or other electronic systems. In a pickup truck application, the typical rear vision system may include a dashboard or console mounted video display, which displays a video image feed taken from a camera located in the tailgate of the truck. The video image provides a rearward field of view to the driver that may be used while backing up. Another type of electronic system is a rear parking assist system, which typically utilizes one or more obstacle-detecting sensors mounted in the tailgate of the pickup truck. When the pickup truck is in reverse gear, the rear parking assist system will generate alerts (e.g., beeping noises and/or lights) when the sensors detect an obstacle in the rearward path of the pickup truck.

To improve fuel economy, an owner may choose to remove the tailgate of the pickup truck to reduce wind drag. However, any components of an electrical system located in the tailgate must be disconnected from the associated components in the main body of the truck. This is typically accomplished by de-coupling harness connectors when removing the tailgate. After the tailgate is removed, the harness connector still attached to the main body may be left exposed. In this condition, harness terminals are susceptible to contamination, corrosion, or damage. In conventional systems, separate harness connector caps are provided to the owner, which, when installed, protect the terminals to ensure continued operability of the system when the tailgate is reattached. These connector caps are typically stored in the glove-box of the pickup truck until initial use and then must be stored again when the tailgate is replaced. The connector caps are easily misplaced by the owner, constitute an additional cost for the manufacturer, and may cause contamination to the terminals.

Accordingly, it is desirable to provide improved harness assemblies for electrical components disposed in the tailgate of pickup trucks. Furthermore, other desirable features and characteristics of the present invention will become apparent from the subsequent detailed description and the appended claims, taken in conjunction with the accompanying drawings and the foregoing technical field and background.

SUMMARY OF THE INVENTION

In accordance with an exemplary embodiment, an electrical harness assembly is provided for coupling a first electrical component in a vehicle to a second electrical component in a removable vehicle portion. The assembly includes a first harness having a first connector and a second connector and configured to be coupled to the first electrical component. The assembly further includes a second harness having a third connector and a fourth connector and configured to be coupled to the second electrical component. In a first state, the first connector mates with the third connector and the second connector mates with the fourth connector, and in a second state, the first connector mates with the second connector.

In accordance with another exemplary embodiment, a method is provided for protecting a plurality of terminals in a harness assembly with a first harness associated with a vehicle main body and a second harness associated with removable vehicle component. The first harness has first and second connectors and the second harness has third and fourth connectors. The method includes decoupling the first and third connectors; decoupling the second and fourth connectors; and coupling the first and second connectors.

DESCRIPTION OF THE DRAWINGS

The present invention will hereinafter be described in conjunction with the following drawing figures, wherein like numerals denote like elements, and wherein:

FIG. 3 is an end view of a first connector of the electrical harness assembly of FIG. 1 in accordance with an exemplary embodiment;

FIG. 4 is an end view of a second connector of the electrical harness assembly of FIG. 1 in accordance with an exemplary embodiment;

FIG. 5 is an end view of a third connector of the electrical harness assembly of FIG. 1 in accordance with an exemplary embodiment;

FIG. 6 is an end view of a fourth connector of the electrical harness assembly of FIG. 1 in accordance with an exemplary embodiment; and FIG. 7 is a partial, isometric view of the electrical harness assembly of FIG. 1 in a second state.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Broadly, exemplary embodiments described herein provide an electrical harness assembly with a first harness disposed within the body of a vehicle and a second harness disposed in a removable vehicle component, such as a tailgate of a pickup truck. Generally, the first harness has first and second connectors that mate with corresponding connectors of the second harness. The first and second harnesses must be disconnected when the tailgate is removed. In this state, the first and second connectors of the first harness may be coupled together to protect the terminals within the harness.

Figure 1:
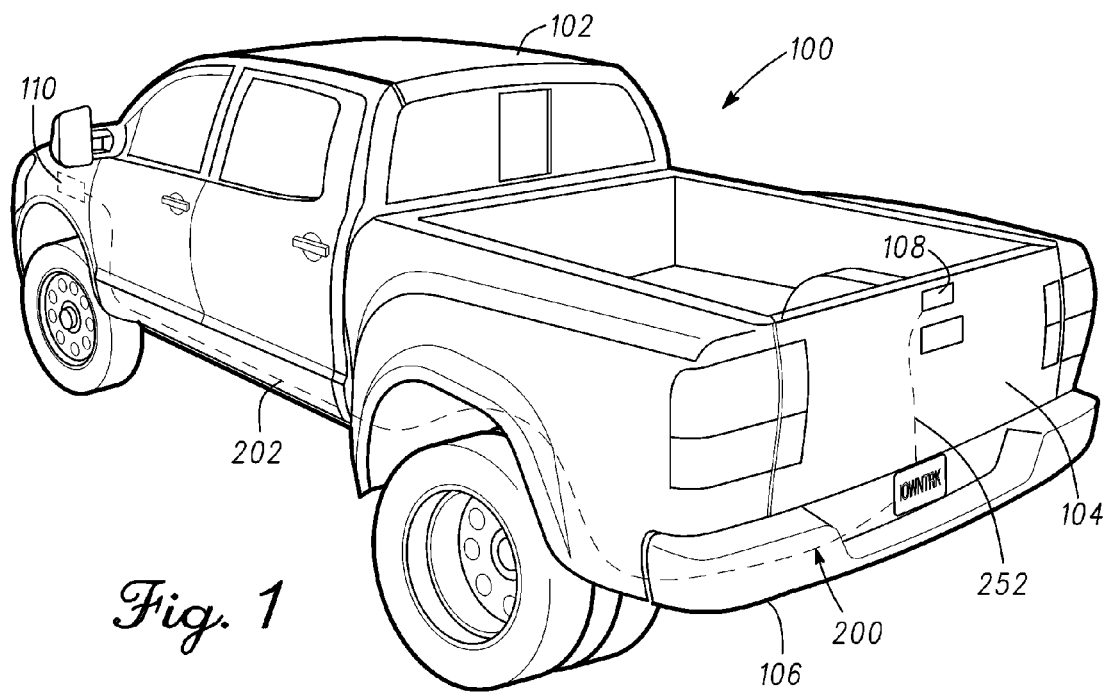
FIG. 1 is a schematic view of a vehicle with an electrical harness assembly in accordance with an exemplary embodiment.

FIG. 1 depicts a vehicle, which in this exemplary embodiment is a pickup truck 100. However, in other embodiments, the vehicle may be an automobile, a sport utility vehicle, a recreational vehicle, a van, another type of truck, or any one of a number of different types of vehicles.

The truck 100 has a main body 102 that includes, for example, a chassis, cabin, and cargo bed. A tailgate 104 is arranged over a bumper 106. In particular, the tailgate 104 is mounted to pivot about an axis to enable access to the cargo bed. According to a general design, the tailgate 104 includes an internal bearing structure and an external cladding material. The tailgate 104 further includes a mounting assembly that enables the tailgate to be removed from the main body 102 and the truck 100 entirely. For example, the mounting assembly may include a standard hinge which utilizes a slotted cylindrical connector such that the tailgate 106 can be removed without having to remove the mounting assembly.

The tailgate 104 may support one or more electrical components, such as, for example, a camera 108 that forms part of a rear vision system 110. The rear vision system 110 is configured to provide video images taken from behind the truck 100 to a driver, and may include, for example, the camera 108 and a display (not shown). As depicted in FIG. 1, the camera 108 is preferably disposed within the tailgate 104 of the truck 100. The camera 108 can be any one of a number of different types of cameras capable of capturing video images including, by way of example only, an analog camera, a digital camera, or various other types of cameras. The camera 108 may be a CCD-type imaging device, a CMOS imaging device, or the like. The display is coupled to receive a display actuation signal, and is configured, upon receipt thereof, to receive the video images from the camera 108 and to display the video images for the driver.

As discussed in greater detail below, a harness assembly 200 is provided to electrically couple the camera 108 in the tailgate 104 to the other portions of the rear vision system 110 in the main body 102 of the truck 100. The harness assembly 200 generally includes a first harness 202 associated with the main body 102 and a second harness 252 in the tailgate 104. Generally, the second harness 252 is threaded through the interior of the tailgate 104 to the camera 108. The first and second harnesses 202, 252 are coupled together, typically at or near the bumper 106, to couple the camera 108 to the rear vision system 110. Additionally, although the first and second harnesses 202, 252 are described with reference to the rear vision system 110, the first and second harnesses 202, 252 may be used with other types of electrical components, including rear radar, lighting apparatuses, power assisted open/close systems, parking assistance systems, and the like. In further exemplary embodiments, the harness assembly 200 may be used with removable vehicle components other than tailgates, such as trailers.

Figure 2:
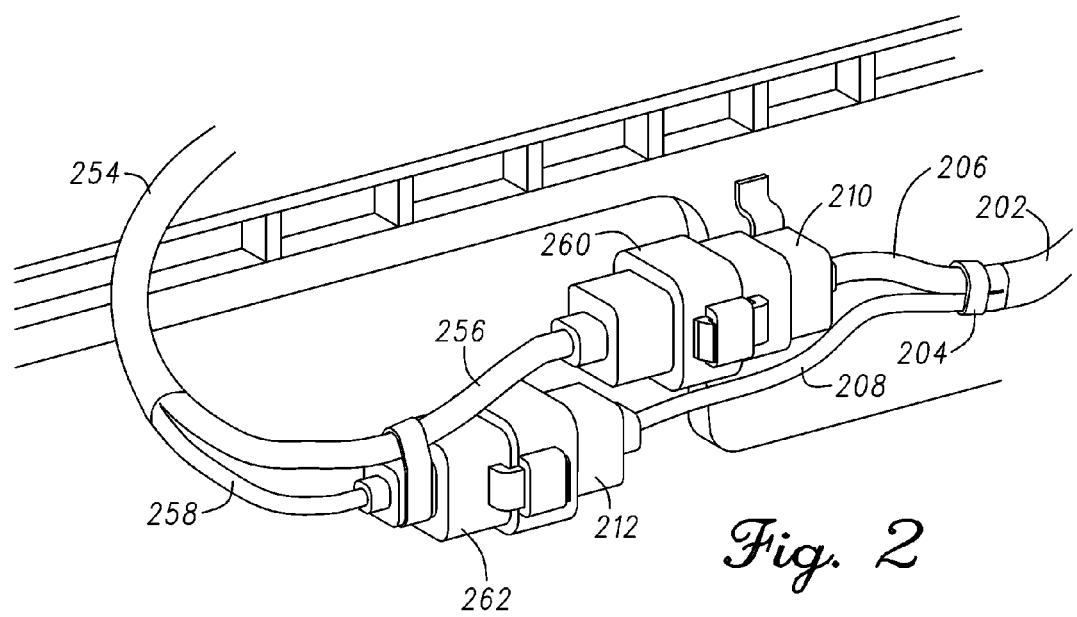
FIG. 2 is a partial, isometric view of the electrical harness assembly of FIG. 1 in a first state.

FIG. 2 is a partial, isometric view of the harness assembly 200 of FIG. 1 in a first state. In general, the view in FIG. 2 is a view in which the harness assembly 200 is accessible after removal of a license plate. As noted above, the harness assembly 200 electrically couples the camera 108 to the rear vision system 110 and includes a first harness 202 in the main body 102 of the truck 100 and a second harness 252 in the tailgate 104 of the truck 100 (FIG. 1). FIG. 2 illustrates the coupling of the first and second harnesses 202, 252 in greater detail. As shown, the first harness 202 has a common cord 204 carrying the electrical connections necessary for operation of the rear vision system 110. The common cord 204 splits into male and female cord portions 206, 208. The male cord portion 206 terminates with a first connector 210, which is a male connector, and the female cord portion 208 terminates with a second connector 212, which is a female connector. Similarly, the second harness 252 has a common cord 254 carrying the electrical connections necessary for operation of the rear vision system 110 that splits into male and female cord portions 256, 258. The female cord portion 256 terminates with a third connector 260, which is a female connector, and the male cord portion 258 terminates with a fourth connector 262, which is a male connector.

The first state of the harness assembly 200, which is shown in FIG. 2, generally occurs when the tailgate 104 is attached to the main body 102. In such a state, the first connector 210 of the first harness 202 mates with the third connector 260 of the second harness 252, and the second connector 212 of the first harness 202 mates with the fourth connector 262 of the second harness 252. As described in greater detail below, the connectors 210, 212, 260, 262 of the first and second harnesses 202, 252 may include a number of terminals for coupling the camera 108 to the rear vision system 110 (FIG. 1).

Generally, the connectors 210, 212, 260, 262 may be any material suitable for housing electrical connections and terminals, including plastic and rubber. Additionally, although the connectors 210, 212, 260, 262 are described as "male" and "female" connectors, any suitable coupling mechanisms may be used. Generally, the connectors 210, 212, 260, 262 are joined together in a friction or snap fit such that they may be de-coupled without tools, although other arrangements are possible. In general, the connectors 210, 212, 260, 262 are sized to facilitate installation. For example, the third and fourth connectors 260, 262 of the second harness 252 are sized such that they may be threaded through the tailgate 104 (FIG. 1), including a hole in the bottom of the tailgate 104 that enables connection with the first harness 202.

FIG. 3 is an end view of a first connector 210 of the harness assembly 200 of FIG. 1. The first connector 210 includes a number of terminals 302, 304, 306, 308 that correspond to the electrical connections within the male cord 206 of the first harness 202. In this exemplary embodiment, the first connector 210 includes a ground terminal 302, a dummy or empty terminal 304, a reverse light power terminal 306, and a first signal terminal 308, which will be described in greater detail below.

FIG. 4 is an end view of a second connector 212 of the harness assembly 200 of FIG. 1. The second connector 212 includes a number of terminals 312, 314, 316, 318 that correspond to the electrical connections within the female cord 208 of the first harness 202. In this exemplary embodiment, the second connector 212 includes a drain shield terminal 312, a second signal terminal 314, a crank power terminal 316, and a dummy terminal 318, which will be described in greater detail below.

FIG. 5 is an end view of a third connector of the electrical harness assembly 200 of FIG. 1. The third connector 260 includes a number of terminals 322, 324, 326, 328 that correspond to the electrical connections within the female cord portion 256 of the second harness 252. In this exemplary embodiment, the third connector 260 includes a ground terminal 322, a dummy terminal 324, a reverse light power terminal 326, and a first signal terminal 328, which will be described in greater detail below.

FIG. 6 is an end view of a fourth connector 262 of the electrical harness assembly 200 of FIG. 1 The fourth connector 262 includes a number of terminals 332, 334, 336, 338 that correspond to the electrical connections within the male cord portion 258 of the second harness 252. In this exemplary embodiment, the fourth connector 262 includes a drain shield terminal 332, a second signal terminal 334, a dummy terminal 336, and a crank power terminal 338, which will be described in greater detail below.

As noted above and referring to FIGS. 3 and 5, in the first state, the first connector 210 mates with the third connector 260. When the first and third connectors 210, 260 are coupled together, the ground terminal 302 of the first connector 210 contacts the ground terminal 322 of the third connector 260. The dummy terminal 304 of the first connector 210 contacts the dummy terminal 324 of the third connector 260. The reverse light power terminal 306 of the first connector 210 contacts the reverse light terminal 326 of the third connector 260. The first signal terminal 308 of the first connector 210 contacts the first signal terminal 328 of the third connector 260.

As noted above and referring to FIGS. 4 and 6, in the first state, the second connector 212 mates with the fourth connector 262. When the second and fourth connectors 212, 262 are coupled together, the drain shield terminal 312 of the second connector 212 contacts the drain shield terminal 332 of the fourth connector 262. The second signal terminal 314 of the second connector 212 contacts the second signal terminal 334 of the fourth connector 262. The crank power terminal 316 of the second connector 212 contacts the crank power terminal 338 of the fourth connector 262, and the dummy terminal 318 of the second connector 212 contacts the dummy terminal 336 of the fourth connector 262.

Now referring to FIGS. 2-6, during operation, the first and second signal terminals 308, 328 and 314, 334 form a portion of the forward and return conductors of the video circuit. The drain shield terminals 312, 332 form a portion of a drain shield that functions to shield the forward and return conductors of a video circuit. The reverse light power terminals 306, 326 form a portion of a first power feed to the video camera that, in particular, signals to the camera 108 (FIG. 1) that the vehicle 100 has shifted into reverse and should begin recording. The crank power terminals 316, 338 form a portion of a second power feed that provides operating power to the camera 108 (FIG. 1) when the engine is running. The ground terminals 302, 322 form a portion of a ground circuit that functions to ground the first and second power feeds. The dummy terminals 304, 318, 324, 336 are empty terminals or terminal slots that are not coupled to an electrical connection during operation. Accordingly, in the first state, terminals 302, 304, 306, 308, 312, 314, 316, 318, 322, 324, 326, 328, 332, 334, 336, 338 are coupled to corresponding terminals 302, 304, 306, 308, 312, 314, 316, 318, 322, 324, 326, 328, 332, 334, 336, 338 to ensure proper operation of the camera 108 and rear vision system 110 (FIG. 1). Typically, the terminals 302, 304, 306, 308, 312, 314, 316, 318, 322, 324, 326, 328, 332, 334, 336, 338 are abutting or plug and socket type terminals in which electrical connections may be established and disconnected with longitudinal force provided by a user, although other types of terminals are possible.

FIG. 7 is a partial, isometric view of the electrical harness assembly 200 of FIG. 1 in a second state. FIG. 7 particularly shows the first harness 202. In the second state, the tailgate 104 and the second harness 252 have been removed from the truck 100 (FIG. 1). As shown in FIG. 7, the first harness 202 is configured such that the first connector 210 mates with the second connector 212. This arrangement protects the terminals 302, 304, 306, 308, 312, 314, 316, 318 of the first and second connectors 210, 212 when the tailgate has been removed and it is necessary to disconnect the first and second harnesses 202, 252.

Referring again to FIGS. 3 and 4, in the second state, the first signal terminal 308 contacts the second signal terminal 314, the reverse light power terminal 306 contacts the dummy terminal 318, the crank feed terminal 316 contacts the dummy terminal 304, and the ground terminal 302 contacts the drain shield terminal 312. Although the camera 108 (FIG. 1) is not operating in the second state, this arrangement seals the terminals 302, 304, 306, 308, 312, 314, 316, 318 and ensures that none of the electrical connections are damaged when the first and second connectors 210, 212 of the first harness 202 are coupled together. Particularly, this arrangement ensures that the power feed circuits do not damage the other circuits. This arrangement additionally enables protection of the terminals 302, 304, 306, 308, 312, 314, 316, 318 without necessitating separate caps that must be stored and maintained by the owner. This may also reduce manufacturing costs.

In the second state, the third and fourth connectors 260, 262 may also be coupled together. Referring to FIGS. 5 and 6, in the second state, the ground terminal 322 contacts the drain shield terminal 332, the second signal terminal 328 contacts the first signal terminal 334, the reverse light power terminal 326 contacts the dummy terminal 336, and the dummy terminal 324 contacts the crank power terminal 338. Although the camera 108 (FIG. 1) is not operating in the second state, this arrangement seals the terminals 322, 324, 326, 328, 332, 334, 336, 338 and ensures that none of the electrical connections are damaged when the third and fourth connectors 260, 262 of the second harness 252 are coupled together. This arrangement enables protection of the terminals 322, 324, 326, 328, 332, 334, 336, 338 without necessitating separate caps that must be stored and maintained by the owner.

Although the depicted embodiment is an eight terminal arrangement with four terminals in each of the connectors 210, 212, 260, 262, other arrangements may be possible. For example, a greater or fewer number of terminals may be provided, depending on the size constraints and the signal and power requirements of the electrical components. Moreover, the type of terminals may be modified. For example, in an alternate embodiment, all of the active terminals associated with the electrical connectors 210, 212, 260, 262 may be housed in the first and third connectors 210, 260 and each of the terminals of the second and fourth connectors 212, 262 may be dummy terminals. In effect, in this exemplary embodiment, the second and fourth connectors 212, 262 may function solely as protective caps attached to the respective first and second harnesses 202, 252. In this embodiment, mating the second and fourth connectors 212, 262 together in the first state may function to prevent contamination.

The connectors 210, 212, 260, 262 may be integrated with or otherwise cooperate with diagnostic components associated with the electrical components. For example, diagnostic hardware may run diagnostics to detect a short or malfunction in the rear vision system 110 during the first state. Similarly, this or additional diagnostic hardware may be provided to detect when the first and second harnesses 202, 252 are disconnected and/or when the first and second connectors 210, 260 are coupled together in the second state. In such circumstances, the diagnostic hardware may initiate a message to the driver, such as a "tailgate removed" message displayed on the display (not shown).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. An electrical harness assembly for coupling a first electrical component in a vehicle to a second electrical component in a removable vehicle portion, the assembly comprising:

a first harness configured to be coupled to the first electrical component, the first harness having a first connector and a second connector; and a second harness configured to be coupled to the second electrical component, the second harness having a third connector and a fourth connector, wherein, in a first state, the first connector mates with the third connector and the second connector mates with the fourth connector, and wherein, in a second state, the first connector mates with the second connector.

2. The electrical harness assembly of claim 1, wherein the first and fourth connectors are male connectors and the second and third connectors are female connectors.

3. The electrical harness assembly of claim 1, wherein the first connector includes a first power terminal, the second connector includes a first dummy terminal, and the third connector includes a second power terminal, and wherein the first power terminal contacts the second power terminal in the first state and the first dummy terminal in the second state.

4. The electrical harness assembly of claim 3, wherein the first connector further includes a third power terminal, the second connector further includes a second dummy terminal, and the third connector further includes a fourth power terminal, and wherein third power terminal contacts the fourth power terminal in the first state and the second dummy terminal in the second state.

5. The electrical harness assembly of claim 4, wherein the first connector further includes a first signal terminal, the second connector further includes a second signal terminal, and the third connector further includes a third signal terminal, and wherein first signal terminal contacts the third signal terminal in the first state and the second signal terminal in the second state.

6. The electrical harness assembly of claim 5, wherein the first connector further includes a first ground terminal, the second connector further includes a drain shield terminal, and the third connector further includes a second ground terminal, and wherein first ground terminal contacts the second ground terminal in the first state and the drain shield terminal in the second state.

7. The electrical harness assembly of claim 1, wherein the second electrical component is a video camera, and wherein the first and second harnesses are configured to provide signal and power feeds to the video camera in the first state.

8. The electrical harness assembly of claim 7, wherein the removable vehicle portion is a tailgate that houses the video camera, and wherein the second harness is sized to be threaded through the tailgate.

9. The electrical harness assembly of claim 1, wherein each of the first, second, third, and fourth harnesses include terminals for electrically coupling the first and second electrical components.

10. The electrical harness assembly of claim 1, wherein the first harness includes a common cord that splits into first and second cords that respectively terminate with the first and second connectors.

11. An electrical harness assembly for coupling a first electrical component in a vehicle to a second electrical component in a tailgate, the assembly comprising:

a first harness configured to be coupled to the first electrical component, the first harness having a first connector and a second connector, the first connector including a first power terminal, a second power terminal, a first signal terminal, and a first ground terminal the second connector including a first dummy terminal, a second dummy terminal, a second signal terminal, and a drain shield terminal; and a second harness configured to be coupled to the second electrical component, the second harness having a third connector and a fourth connector, the third connector including a third power terminal, a fourth power terminal, a third signal terminal, and a second ground terminal, wherein, in a first state, the first connector mates with the third connector such that the first power terminal contacts the third power terminal, the second power terminal contacts the fourth power terminal, the first signal terminal contacts the third signal terminal, wherein first ground terminal contacts the second ground terminal, and wherein, in a second state, the first connector mates with the second connector such that the first power terminal contacts the first dummy terminal, the second power terminal contacts the second dummy terminal, the first signal terminal contacts the second signal terminal, an the first ground terminal contacts the drain shield terminal.

12. The electrical harness assembly of claim 11, wherein the second electrical component is a video camera, and wherein the first and second harnesses are configured to provide signal and power feeds to the video camera in the first state.

13. The electrical harness assembly of claim 11, wherein the removable vehicle portion is a tailgate that houses the video camera, and wherein the second harness is sized to be threaded through the tailgate.

* * * * *